United States Patent
Nielsen et al.

(10) Patent No.: US 12,290,995 B2
(45) Date of Patent: May 6, 2025

(54) GUIDE MEMBER FOR GUIDING A SHEAR WEB OF WIND TURBINE BLADE

(71) Applicants: LM WIND POWER A/S, Kolding (DK); LM WIND POWER R&D (HOLLAND) B.V., Heerhugowaard (DK)

(72) Inventors: Michael Wenani Nielsen, Kolding (DK); Kristian Lehmann Madsen, Kolding (DK); Suresh Babu Gangavaram Pandarinath, Karnataka Bengaluru (IN); Pavel Zhuravlov, Heerhugowaard (NL)

(73) Assignees: LM WIND POWER A/S, Kolding (DK); LM WIND POWER R&D (HOLLAND) B.V., Heerhugowaard (NL)

( * ) Notice: Subject to any disclaimer, the term of this patent is extended or adjusted under 35 U.S.C. 154(b) by 0 days.

(21) Appl. No.: 18/275,801

(22) PCT Filed: Feb. 4, 2022

(86) PCT No.: PCT/EP2022/052710
§ 371 (c)(1),
(2) Date: Aug. 3, 2023

(87) PCT Pub. No.: WO2022/167585
PCT Pub. Date: Aug. 11, 2022

(65) Prior Publication Data
US 2024/0293982 A1    Sep. 5, 2024

(30) Foreign Application Priority Data
Feb. 4, 2021 (EP) .................................. 21155198

(51) Int. Cl.
*B29C 70/68* (2006.01)
*B29C 33/12* (2006.01)
(Continued)

(52) U.S. Cl.
CPC ............ *B29C 70/681* (2013.01); *B29C 33/12* (2013.01); *F03D 1/0684* (2023.08); *B29L 2031/085* (2013.01)

(58) Field of Classification Search
CPC .... F03D 1/0675; F03D 1/0679; F03D 1/0684; B29C 70/68; B29C 70/681;
(Continued)

(56) References Cited

U.S. PATENT DOCUMENTS

| | | | |
|---|---|---|---|
| 11,131,289 B2* | 9/2021 | Hawkins | ............... F03D 1/0675 |
| 2016/0040651 A1* | 2/2016 | Yarbrough | .......... B29C 70/0035 |
| | | | 156/245 |

(Continued)

FOREIGN PATENT DOCUMENTS

| | | | |
|---|---|---|---|
| CN | 207630561 U | * | 7/2018 |
| WO | 2015/197076 A1 | | 12/2015 |

(Continued)

OTHER PUBLICATIONS

CN207630561U_MachineTranslation (Li, L.) 2018-07-20. [retrieved on Jun. 26, 2024] Retrieved from: Espacenet. (Year: 2018).*
(Continued)

*Primary Examiner* — Elton K Wong
(74) *Attorney, Agent, or Firm* — Nath, Goldberg & Meyer; Tanya E. Harkins

(57) ABSTRACT

The present invention relates to method of manufacturing a wind turbine blade, the method comprising the steps of providing a first shell half and a second shell half, providing a shear web having a first edge and an opposing second edge, and attaching the first edge of the shear web to an inner
(Continued)

Figure 1:
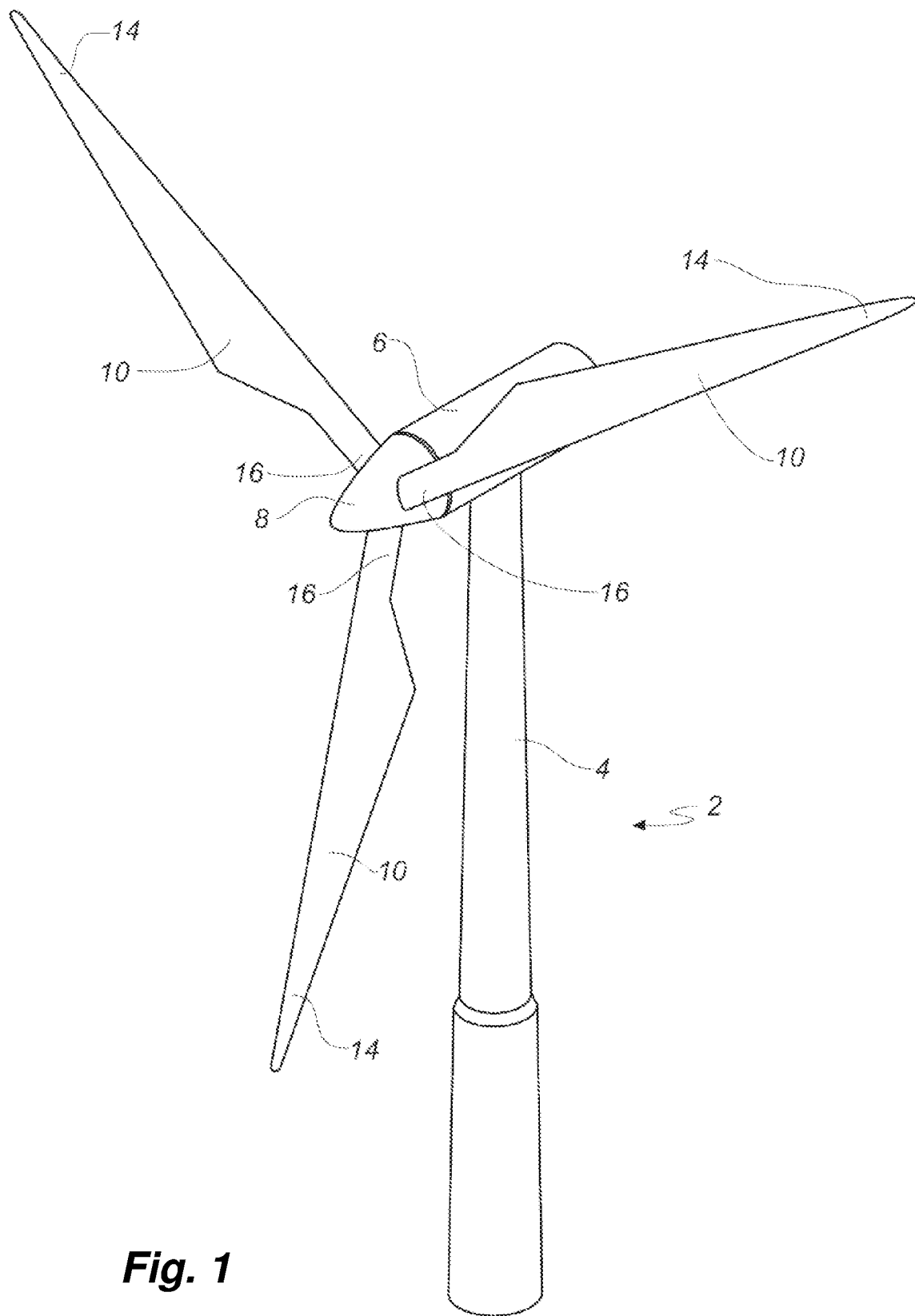

surface of the first shell half. One or more guide members are mounted onto an inner surface of the second shell half for guiding the shear web, each guide member comprising a hollow body and a guiding surface.

15 Claims, 4 Drawing Sheets

(51) Int. Cl.
    *B29L 31/08*     (2006.01)
    *F03D 1/06*     (2006.01)

(58) Field of Classification Search
CPC ... B29C 70/682; B29C 70/683; B29C 70/541; B29C 70/543; B29C 33/12; B29C 65/7802; B29C 65/7805; B29C 65/7814; B29C 65/7823; B29C 65/7826; B29C 65/7829; B29C 65/7838; B29L 2031/08; B29L 2031/082; B29L 2031/085; B29L 2031/087; F05B 2280/702

See application file for complete search history.

(56) References Cited

U.S. PATENT DOCUMENTS

| | | | |
|---|---|---|---|
| 2021/0102523 A1* | 4/2021 | Smith | B29C 66/112 |
| 2022/0055330 A1* | 2/2022 | Bech | B29C 66/543 |

FOREIGN PATENT DOCUMENTS

| | | |
|---|---|---|
| WO | 2017/088890 A1 | 1/2017 |
| WO | 2018/224104 A1 | 12/2018 |
| WO | 2019/091531 A1 | 5/2019 |
| WO | 2020/114564 A1 | 6/2020 |

OTHER PUBLICATIONS

'Injection Moulding'. Wikipedia [online]. 2015, [retrieved on Jun. 26, 2022]. Retrieved from the Internet: <URL: https://web.archive.org/web/20150103232308/https://en.wikipedia.org/wiki/Injection_moulding> (Year: 2015).*

* cited by examiner

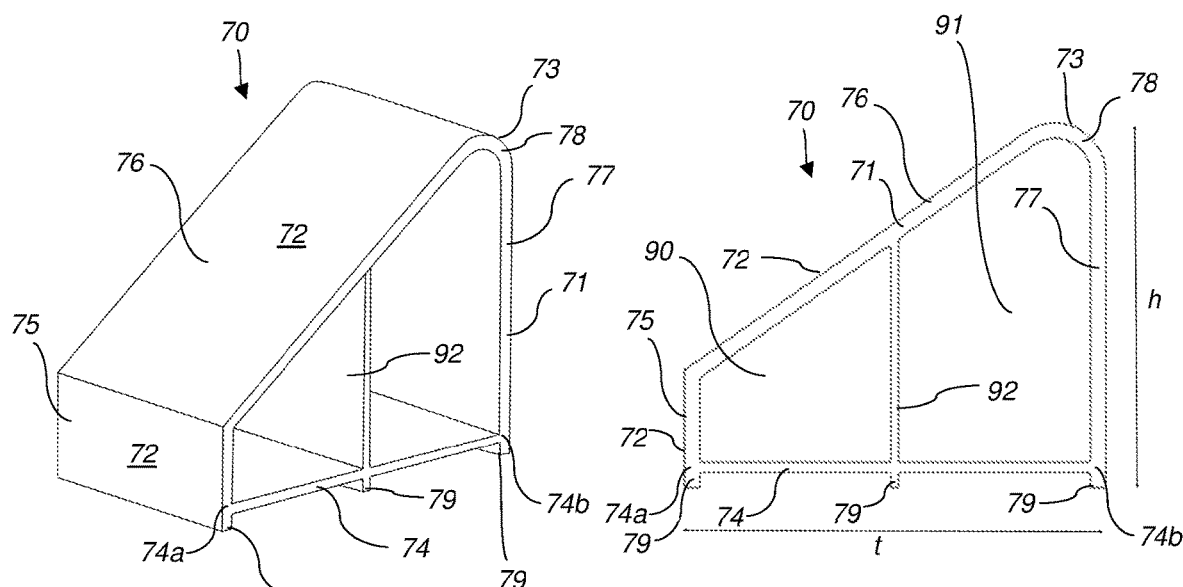
Fig. 7
Fig. 8
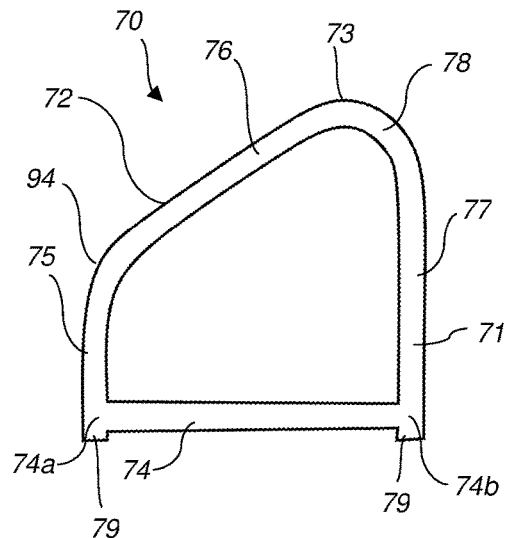
Fig. 9
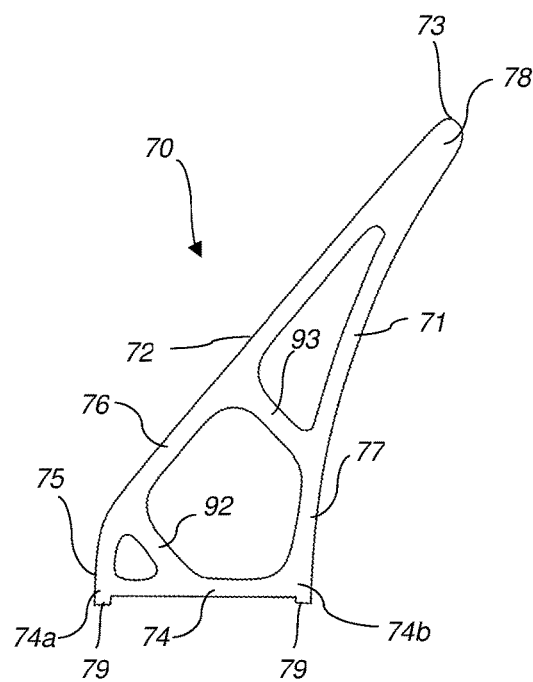
Fig. 10

GUIDE MEMBER FOR GUIDING A SHEAR WEB OF WIND TURBINE BLADE

This is a National Phase Application filed under 35 U.S.C. 371 as a national stage of PCT/EP2022/052710, filed Feb. 4, 2022, an application claiming the benefit of European Application No. 21155198.1, filed Feb. 4, 2021, the content of each of which is hereby incorporated by reference in its entirety.

FIELD OF THE INVENTION

The present invention relates to a method for manufacturing a wind turbine blade and to a wind turbine blade obtainable by said method.

BACKGROUND OF THE INVENTION

Wind power provides a clean and environmentally friendly source of energy. Wind turbines usually comprise a tower, generator, gearbox, nacelle, and one or more rotor blades. The wind turbine blades capture kinetic energy of wind using known airfoil principles. Modern wind turbines may have rotor blades that exceed 90 meters in length.

Wind turbine blades are usually manufactured by forming two shell parts or shell halves from layers of woven fabric or fibre and resin. Wind turbine blades of fibre-reinforced polymer are usually manufactured in moulds, where the pressure side and the suction side of the blade are manufactured separately by arranging glass fibre mats and/or other fibre-reinforcement material, such as carbon fibre, in each of the two mould parts. The two shell halves are usually glued together, wherein an adhesive is applied to the inner face of the lower blade half before the upper blade half is lowered thereon.

Spar caps or main laminates are placed or integrated in the shell halves and may be combined with shear webs or spar beams to form structural support members. Spar caps or main laminates may be joined to, or integrated within, the inside of the suction and pressure halves of the shell. Thus, the shear webs are typically bonded to the inside surface of the lower blade half prior to adhering the upper blade half, usually by means of upper and lower mounting flanges forming opposing edges of the shear web, arranged perpendicular to the web body. An adhesive such as epoxy is applied along these mounting flanges for bonding the shear webs to the respective inner surface of the shell half.

However, one of the challenges involved in this approach is the correct positioning and alignment of the shear web(s) during the closing operation of the blade halves. If the shear webs move slightly before the shell halves are closed this may result in incorrect positioning and bonding. This is particularly a problem when the bond line surface is at an inclination, i.e. when the web flange/shell surface is at an angle from horizontal, which may result in undesired sliding motion of the shear web.

WO 2015/197076 A1 discloses a method of making a wind turbine blade in which a guide block is attached to the inner surface of a half shell adjacent to the shear web mounting region. The guide block has a guide surface oriented transversely to the inner surface of the second half shell for guiding the shear web over the guide surface of the mounting block towards the shear web mounting region.

However, it has been found that this and other known solutions tend to add an undesirable extra weight to the wind turbine blade. Furthermore, this and other known solutions are found to provide insufficient shear web alignment and/or can even lead to damage of the shear webs and/or the guide blocks when closing the shell halves around the shear web. Another challenge is that these solutions tend to be costly and rather inefficient. Furthermore, it has been found that detached prior art guide blocks pose a risk during operation of the wind turbine in that they may damage other components within the blade.

Other known shear web alignment approaches include assembly jigs that place and hold the webs in the shell until the glue is cured, after which the other shell bond line can be bonded. This may be disadvantageous as it usually incurs high cost and impact to the moulding cycle time. Another known approach is to us support braces that need to be removed after the blade has been bonded together. This is often cumbersome as operators need to enter the blade and remove the features, which can be difficult, in particular for small blades.

It is therefore an object of the present invention to provide an optimized arrangement allowing correct positioning of shear webs in the manufacture of a wind turbine blade.

It is another object of the present invention to provide a method of manufacturing a wind turbine blade which allows an improved process control in terms of accurately arranging shear webs between the inner shell surfaces.

It is another object of the present invention to provide a simplified, safer, and more cost-effective method of manufacturing a wind turbine blade.

It is another object of the present invention to provide an improved method of manufacturing a wind turbine blade, wherein assembling of the wind turbine blade is facilitated.

SUMMARY OF THE INVENTION

It has been found that one or more of the aforementioned objects can be obtained by providing a method of manufacturing a wind turbine blade having a profiled contour including a pressure side and a suction side, and a leading edge and a trailing edge with a chord having a chord length extending therebetween, the wind turbine blade extending in a spanwise direction between a root end and a tip end, the method comprising the steps of
  providing a first shell half and a second shell half,
  providing a shear web having a first edge and an opposing second edge,
  attaching the first edge of the shear web to an inner surface of the first shell half,
  providing at least one guide member, the guide member comprising a hollow body and a guiding surface,
  mounting the at least one guide member onto an inner surface of the second shell half, wherein the guide member is mounted adjacent to a predefined shear web mounting region on the inner surface of the second shell half, such that the guiding surface forms an angle with the inner surface of the second shell half at the shear web mounting region,
  bringing the first and second shell halves together while guiding the second edge of the shear web over the guiding surface of the guide member towards the shear web mounting region, and
  attaching the second edge of the shear web to the shear web mounting region of the second shell half.

Thus, the guide member is used to guide and correctly position the shear web on the inner surface of the second shell half. It was found that the method of the present invention results in lower production costs and in a more simplified production process. Also, the present method reduces the risk of damaging the shear webs in the blade closure step and during subsequent operation of the wind turbine. In particular, hard impacts, e.g. from detached guide members, can be reduced by the present guide member design using a hollow body, as compared to prior art solutions.

The first shell half may be a pressure side shell half or a suction side shell half. Similarly, the second shell half may be a pressure side shell half or a suction side shell half. Each shell half usually comprises a reinforcing structure such as a spar cap. The blade shell material may include one or more fibre layers and/or a gelcoat. The shell halves of the blade will typically be produced by infusing a fibre lay-up of fibre material with a resin such as epoxy, polyester or vinyl ester. Usually, the pressure side shell half and the suction side shell half are manufactured using a blade mould. Each of the shell halves may comprise spar caps or main laminates provided along the respective pressure and suction side shell members as reinforcing structures. According to some embodiments, the first shell half and the second shell half each have a longitudinal extent L of 50-100 m, preferably 60-90 m.

A shear web is provided having a first edge and an opposing second edge, which are preferably formed as mounting flanges. Each shear web may comprise a web body, a first web foot flange at a first end of the web body, and a second web foot flange at a second end of the web body. In some embodiments, the shear webs are substantially I-shaped. Alternatively, the shear webs may be substantially C-shaped.

The first edge of the shear web is attached to an inner surface of the first shell half. Usually, the first and the second edges of the shear web are formed as mounting flanges. The shear web may be formed as an I-shaped shear web or as a C-shaped shear web. The first edge of the shear web may be attached to a respective shear web mounting region on the inner surface of the first shell half, for example by using an adhesive or a bonding paste. In some embodiments, a guide member, or a pair of guide members, or a plurality of pairs of guide members, are used to guide the first edge of the shear web towards a predefined mounting region on the inner surface of the first shell half. Thus, in some embodiments, guide members may be used on both shell halves.

While at least one guide member is provided on an inner surface of the second shell half, it is preferred that more than one guide member is provided, such as a pair of guide members, or a plurality of pairs of guide members, spaced at intervals in the spanwise direction.

At least part of the guiding surface of the guide member forms an angle with the inner surface of the second shell half at the shear web mounting region, preferably a right angle. When correctly positioned on the mounting region, the shear web preferably abuts at least part of the guiding surface of the guide member, for maintaining the shear web in place during bonding. Thus, the guide members also stabilize the shear webs during bonding, leading to improved bond lines, and during subsequent operation of the wind turbine.

The guide member is preferably made of a polymer material, such as a thermoplastic polymer, such as ABS, and comprises a hollow body and a guiding surface. This is relatively cost-effective and easy to manufacture, and can be advantageously used to obtain recyclable guide members. In some embodiments, the guide member may taper in thickness from the thick end towards the thin end, wherein the thick end comprises a mounting surface for attaching the guide member to the inner surface of the shell half. The opposing thin end preferably comprises a rounded edge extending into the interior space of the blade, when the guide member is mounted to the inner surface of the shell half. It was found that the provision of such rounded edge provides a safer configuration, i.e. resulting in a lower likelihood of creating injuries of workers while manufacturing the blade. It was also found that the provision of such rounded edges leads to less damage within the blade during operation of the wind turbine, should the guide members unintentionally detach from the surface of the shell half.

In a preferred embodiment, the guide member is formed as a hollow profile, preferably a hollow polymer profile, preferably with constant cross section. It is particularly preferred that the guiding surface of the guide member comprises no sharp edges. Thus, in a preferred embodiment, any edges or corners of the guide member which extend into the interior of the blade are rounded corners or rounded edges. It was found that avoiding sharp edges and acute angles offers a safer solution of guiding shear webs as compared to known approaches. This also minimizes the risks for operators or service teams when they have to enter the blade.

In a preferred embodiment, a first portion of the guiding surface is located adjacent to the shear web mounting region and oriented substantially perpendicular to the inner surface of the shell half at the shear web mounting region. A second portion of the guiding surface of the guide member is preferably inclined relative to the first portion of the guide member, such as extending from the first portion at an angle. As the shell halves are brought together, the edge of the shear web may, for example, first be guided over the second portion of the guiding surface of the guide member, and then over the first portion of the guiding surface of the garden, before ending up on the shear web mounting region. In some embodiments, a transition between the first portion and the second portion is formed by an obtuse angle. In a preferred embodiment, a transition between the first portion and the second portion is formed by a rounded edge. In one embodiment, the transition between the first portion and the second portion is formed by an obtuse angle.

The step of mounting the at least one guide member onto an inner surface of the second shell half preferably comprises gluing or bonding the guide member to the inner surface, e.g. to a spar cap surface, by using a suitable adhesive.

The guide member is mounted adjacent to a predefined shear web mounting region on the inner surface of the second shell half, such that the guiding surface forms an angle with the inner surface of the second shell half at the shear web mounting region. It is preferred that the guide surface of each block is oriented transversely to the inner surface of the second shell half at the shear web mounting region. The mounting region may be defined by a graphic indication such as paint or by projecting a predetermined pattern onto the inner surface for example by using a suitable projection technique such as laser projection.

The first and second shell halves are brought together, usually by closing the blade mould comprising a first mould part and a second mould part, while guiding the second edge of the shear web over the guiding surface of the guide member towards the shear web mounting region. The second edge of the shear web is attached to the shear web mounting region of the second shell half. This is typically done by applying an adhesive or bonding paste to the second edge, which may take the form of a mounting flange, and/or to the inner surface of the shell half at the shear web mounting region. Also, the shell halves are usually bonded to each other in this step along respective leading edge and trailing edge flanges, usually using an adhesive.

In a preferred embodiment, at least one pair of guide members is provided, each pair comprising a first guide member and a second guide member, and wherein the first and the second guide members are mounted at opposite sides of the predefined shear web mounting region, as seen in a chordwise direction, wherein the respective guiding surfaces of the first and the second guide member face towards each other. It is thus preferred that the shear web is guided in a direction towards the space in between the two opposing guide members, as seen in a chordwise direction. In some embodiments, the guiding surfaces face a blade centreline. The pair of guide members may advantageously act as a funnel to place and align the shear web. Including at least one pair of guide members, preferably several pairs of guide members, on both shell halves also reduces the risk of the shear webs rotating and twisting during the bonding process. In a preferred embodiment, two or more, such as three or more, such as four or more, pairs of guide members are provided, per shell half, the pairs of guide members being spaced apart in a spanwise direction. In some embodiments, a pair of opposing guide members is arranged every 3-8 meters when moving in a chordwise direction. Thus, per shear web, the blade may comprise 30-40 guide members.

In a preferred embodiment, the step of mounting the pair of guide members onto the inner surface of the second shell half comprises removably arranging a spacing tool on the inner surface of the second shell, such that the spacing tool extends in a chordwise direction, and mounting the first guide member and the second guide member to the inner surface of the second shell half such that each guide member abuts a respective end surface of the spacing tool.

In a preferred embodiment, a plurality of pairs of guide members are mounted onto the inner surface of the second shell half, the pairs of guide members being spaced at intervals in the spanwise direction.

In a preferred embodiment, the guide member is an extruded or an injection-moulded polymer part. The guide member may be made of one or more thermoplastic polymers, such as acrylonitrile butadiene styrene (ABS). In other embodiments, the guide member is made of fibre-reinforced polymer, a cellulose material, or a foam material, such as polyurethane.

In a preferred embodiment, the guide member comprises a hollow body which is open at opposing ends of the guide member. Thus, the guide member is preferably open at the side facing the tip end of the blade, and at the side facing the root end of the blade.

In a preferred embodiment, the guide member comprises at least one curved outer surface. It is thus preferred that the guide member comprises at least one rounded edge.

It is particularly preferred that all edges of the guide member extending into the interior of the blade are rounded edges.

In a preferred embodiment, the guide member is made of an electrically non-conductive material, such as a non-conductive polymer. This is advantageous for avoiding any unintentional interaction with the blade lightning protection system.

In a preferred embodiment, the guide member comprises
a base part for attachment to the inner surface of the shell half, the base part having a front end and an opposing back end,
a first front part extending from the front end of the base part and oriented substantially perpendicular to the base part,
a second front part which extends from the first front part at an angle relative to the first front part, wherein the guiding surface of the guide member is provided by the outer surfaces of the first front part and the second front part,
a back part extending from the back end of the base part and oriented substantially perpendicular to the base part, and
a curved section which extends between the back part and the second front part.

It is particularly preferred that the guide member is a unitary part, i.e. in that all parts are made of the same material and as one piece. The height of the back part, i.e. the flapwise extent, is preferably between 60 and 100 mm. The thickness, i.e. the chordwise extent, of the base part is preferably between 60 and 100 mm. It is preferred that the thickness of the base part is at least as high as the height of the back part. This was found to lead to an improved adhesion, while minimising the risk of injury during blade manufacturing.

In a preferred embodiment, the outer surface area of the base part is at least 80%, preferably at least 100%, of the outer surface area of the back part. This configuration is advantageous in that it leads to a decrease in a protruding length of the guide member into the blade interior.

In a preferred embodiment, the base part further comprises one or more ridges extending from an outer surface of the base part in between the front end and the back end of the base part. The ridges preferably extend in a substantially spanwise direction when the guide member is mounted to the shell half surface. The ridges may advantageously act to control the bond line thickness or the amount of adhesive used to bond the base part of the guide member to the inner surface of the shell half. Thus, the ridges may act as distance plug to control a maximum bond line thickness. This results in more consistent and uniform bond lines, and saves costs of excess adhesive. In some embodiments, each guide member comprises two ridges. In other embodiments, each guide member comprises three ridges.

It is preferred that the guide members have a uniform cross section across their entire length, i.e. their entire spanwise extent. In a preferred embodiment, the guide member comprises an internal web subdividing the hollow body into a first hollow section and a second hollow section. In some embodiments, the guide member comprises two internal webs subdividing the hollow body into a first, second and third hollow section.

In another aspect, the present invention relates to a wind turbine blade having a profiled contour including a pressure side and a suction side, and a leading edge and a trailing edge with a chord having a chord length extending therebetween, the wind turbine blade extending in a spanwise direction between a root end and a tip end, the blade comprising
a first shell half and a second shell half joined together and defining an interior space in between the shell halves,
at least one shear web having a first edge and an opposing second edge, wherein the first edge of the shear web is attached to an inner surface of the first shell half, and the second edge of the shear web is attached to an inner surface of the second shell half,
at least one guide member comprising a hollow body and a guiding surface, the guide member being mounted onto an inner surface of the second shell half adjacent to the second edge of the shear web, such that the guiding surface forms an angle with the inner surface of the second shell half.

In a preferred embodiment, the wind turbine blade comprises at least one pair of guide members, each pair comprising a first guide member and a second guide member, and wherein the first and the second guide members are mounted at opposite sides of the predefined shear web mounting region, as seen in a chordwise direction, wherein the respective guiding surfaces of the first and the second guide member face towards each other.

In a preferred embodiment, each guide member comprises
- a base part for attachment to the inner surface of the shell half, the base part having a front end and an opposing back end,
- a first front part extending from the front end of the base part and oriented substantially perpendicular to the base part,
- a second front part which extends from the first front part at an angle relative to the first front part, wherein the guiding surface of the guide member is provided by the outer surfaces of the first front part and the second front part,
- a back part extending from the back end of the base part and oriented substantially perpendicular to the base part, and
- a curved section which extends between the back part and the second front part.

In another aspect, the present invention relates to a guide member for guiding a shear web of a wind turbine blade in a method of manufacturing a wind turbine blade, the guide member being an extruded or an injection-moulded polymer part, and comprising a hollow body and a guiding surface, the guide member further comprising
- a base part for attachment to the inner surface of the shell half, the base part having a front end and an opposing back end,
- a first front part extending from the front end of the base part and oriented substantially perpendicular to the base part,
- a second front part which extends from the first front part at an angle relative to the first front part,
- a back part extending from the back end of the base part and oriented substantially perpendicular to the base part, and
- a curved section which extends between the back part and the second front part.

In some embodiments, a transition section is provided between the second front part and the first front part, wherein the transition section comprises a curved outer surface or a rounded edge.

All features and embodiments discussed above with respect to the method of manufacturing a wind turbine blade likewise apply to the wind turbine blade of the present invention and to the guide member of the present invention, and vice versa.

As used herein, the term "spanwise" is used to describe the orientation of a measurement or element along the blade from its root end to its tip end. In some embodiments, spanwise is the direction along the longitudinal axis and longitudinal extent of the wind turbine blade.

DESCRIPTION OF THE INVENTION

Figure 2:
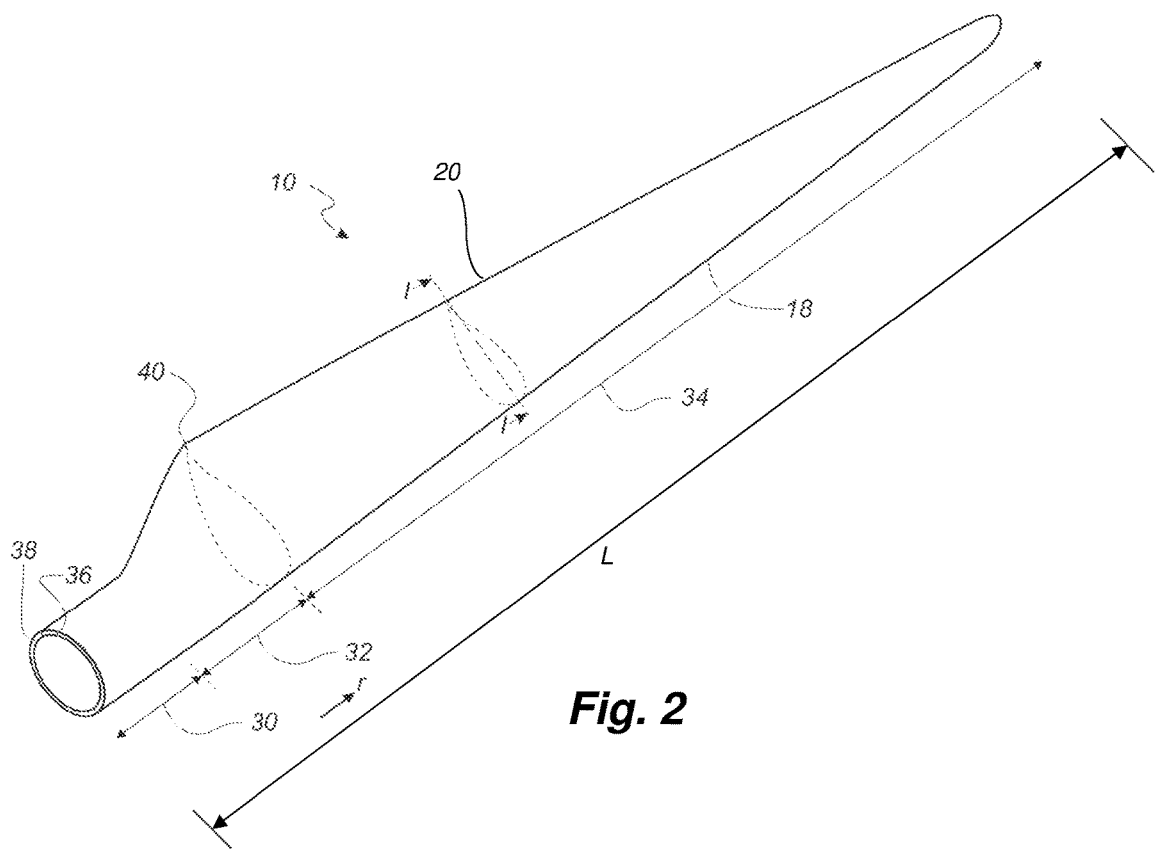
Figure 3:
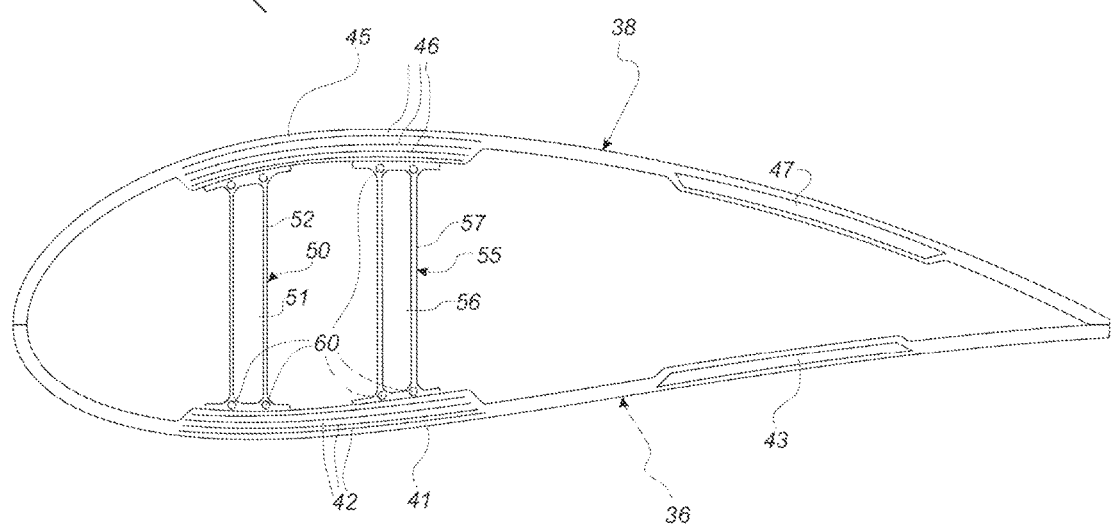
Figure 4:
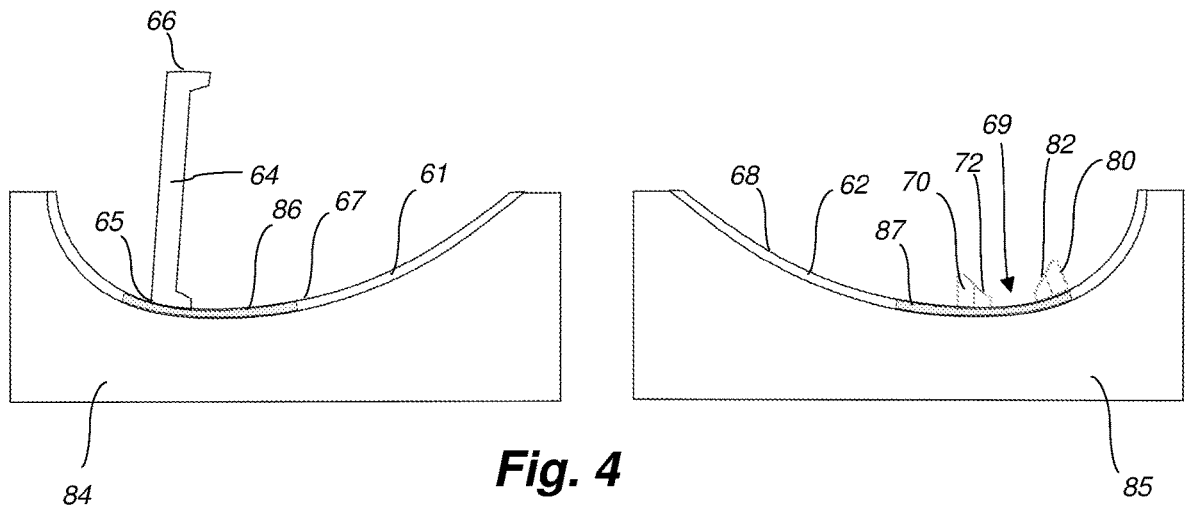
Figure 5:
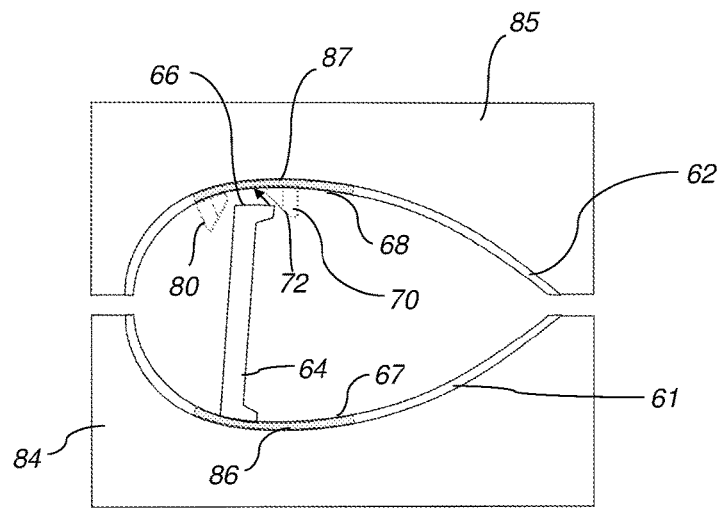
Figure 6:
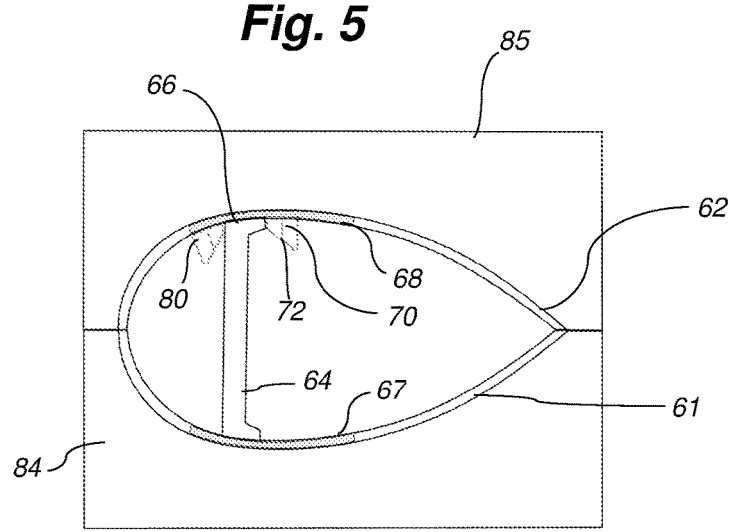

The invention is explained in detail below with reference to embodiments shown in the drawings, in which FIG. 1 shows a wind turbine, FIG. 2 shows a schematic view of a wind turbine blade, FIG. 3 shows a schematic view of a cross-section of a wind turbine blade, FIGS. 4-6 are cross sectional views illustrating various steps of a method of manufacturing a wind turbine blade according to the present invention, FIG. 7 is a perspective view of one embodiment of a guide member of the present invention, FIG. 8 is a cross sectional view of the guide member shown in FIG. 7, FIG. 9 is a cross sectional view of another embodiment of a guide member of the present invention, and FIG. 10 is a cross sectional view of another embodiment of a guide member of the present invention.

DETAILED DESCRIPTION OF THE FIGURES

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 farthest from the hub 8. The rotor has a radius denoted R.

FIG. 2 shows a schematic view of a wind turbine blade 10. The wind turbine blade 10 has the shape of a conventional wind turbine blade and comprises a root region 30 closest to the hub, a profiled or an airfoil region 34 farthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34. FIG. 2 also illustrates the longitudinal extent L, length or longitudinal axis of the blade.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The blade is typically made from a pressure side shell part 36 and a suction side shell part 38 that are glued to each other along bond lines at the leading edge 18 and the trailing edge of the blade 20.

FIG. 3 shows a schematic view of a cross section of the blade along the line I-I shown in FIG. 2. As previously mentioned, the blade 10 comprises a pressure side shell part 36 and a suction side shell part 38. The pressure side shell part 36 comprises a spar cap 41, also called a main laminate, which constitutes a load bearing part of the pressure side shell part 36. The spar cap 41 comprises a plurality of fibre layers 42 mainly comprising unidirectional fibres aligned along the longitudinal direction of the blade in order to provide stiffness to the blade. The suction side shell part 38 also comprises a spar cap 45 comprising a plurality of fibre layers 46. The pressure side shell part 36 may also comprise a sandwich core material 43 typically made of balsawood or foamed polymer and sandwiched between a number of fibre-reinforced skin layers. The sandwich core material 43 is used to provide stiffness to the shell in order to ensure that the shell substantially maintains its aerodynamic profile during rotation of the blade. Similarly, the suction side shell part 38 may also comprise a sandwich core material 47.

The spar cap 41 of the pressure side shell part 36 and the spar cap 45 of the suction side shell part 38 are connected via a first shear web 50 and a second shear web 55. The shear webs 50, 55 are in the shown embodiment shaped as substantially I-shaped webs. The first shear web 50 comprises a shear web body and two web foot flanges. The shear web body comprises a sandwich core material 51, such as balsawood or foamed polymer, covered by a number of skin layers 52 made of a number of fibre layers. The blade shells 36, 38 may comprise further fibre-reinforcement at the leading edge and the trailing edge. Typically, the shell parts 36, 38 are bonded to each other via glue flanges.

FIGS. 4-6 illustrate various stages of a method of manufacturing a wind turbine blade according to the present invention. A first shell a first shell half 61 and a second shell half 62 are provided in respective mould parts 84, 85. In the open configuration illustrated in FIG. 4, the mould parts 84, 85 are arranged side by side, while in the closed configuration shown in FIG. 6, the mould parts are placed on top of one another. Each shell half 61, 62 comprises a respective spar cap 86, 87, forming part of the inner surfaces 67, 68 of the shell halves 61, 62, in particular for supporting a shear web 64 in between spar caps 86, 87. A shear web 64 is provided having a first edge 65 and an opposing second edge 66, which are usually designed as mounting flanges for improved bonding to the shell halves. The illustrated embodiment shows a single C-shaped shear web, however, several shear webs, such as two shear webs may be used per blade, and the shear web(s) may have other configurations, such as a substantially I-shaped form.

The first edge 65 of the shear web 64 is attached to the inner surface 67 of the first shell half 61, for example by using a suitable adhesive between edge/mounting flange 65 and spar cap 86. Two guide members 70, 80 are provided, each of the guide members comprising a hollow body 71 and a guiding surface 72, as best seen in the detailed illustrations of FIGS. 7 and 8. The guide members 70, 80 are mounted onto the inner surface 68 of the second shell half 62, wherein each guide member 70, 80 is mounted adjacent to a predefined shear web mounting region 69 on the inner surface 68 of the second shell half 62. The first and the second guide members 70, 80 are mounted at opposite sides of the predefined shear web mounting region 69, as seen in a chordwise direction, wherein the respective guiding surfaces 72, 82 of the first and the second guide member face towards each other. The respective guiding surfaces 72, 82 each form an angle with the inner surface 68 of the second shell half 62 at the shear web mounting region 69.

In the mould closing operation illustrated in FIG. 5, the first and second shell halves 61, 62 are brought together while guiding the second edge 66 of the shear web 64 over the guiding surface 72 of the guide member 70 towards the shear web mounting region 69. In FIG. 5, the shear web 64 has a slight misalignment towards the right hand side, however, the shear web may also be inclined to the left hand side, in which case its second edge 66 would be guide by guide member 80 instead. In the final step, FIG. 6, the second edge 66 of the shear web 64 is attached to the shear web mounting region 69 of the second shell half 62, preferably at the same time as the blade trailing edges and leading edges are joined.

As best seen in FIGS. 7-10, the guide member 70 comprises a hollow body 71 which is open at opposing ends of the guide member, thus creating tubular spaces or hollow sections 90, 91. Also, each guide member 70 comprises at least one curved outer surface 73. As seen in the various embodiments of FIGS. 7-10, the guide member 70 comprises a base part 74 for attachment to the inner surface of the shell half, the base part having a front end 74a and an opposing back end 74b, a first front part 75 extending from the front end 74a of the base part 74 and oriented substantially perpendicular to the base part 74, a second front part 76 which extends from the first front part 75 at an angle relative to the first front part 75. The guiding surface 72 of the guide member 70 is provided by the outer surfaces of the first front part 75 and the second front part 76. A back part 77 extends from the back end 74b of the base part and is oriented substantially perpendicular to the base part 74. Also, a curved section 78 extends between the back part 77 and the second front part 76, the curved section 78 providing the aforementioned curved outer surface 73. The height h of the back part 77 is preferably between 60 and 100 mm. The thickness t of the base part 74 is preferably between 60 and 100 mm.

In addition, the base part 74 further comprises one or more ridges 79 extending from an outer surface of the base part in between the front end 74a and the back end 74b of the base part. The ridges 79 are advantageously used to control the amount of adhesive or bonding paste applied to the outer surface of the base part, in that the ridges 79 act as a thickness control for the adhesive bond line. In some embodiments, the guide member 70 may also comprise an internal web 92 subdividing the hollow body into a first hollow section 90 and a second hollow section 91. The embodiment shown in FIG. 10 comprises two internal webs 92, 93, thus creating a total of three hollow sections in the guide member. Also, as seen in the embodiment of FIG. 9, a curved edge transition region 94 may be provided between the first front part 75 and the second front part 76.

The invention is not limited to the embodiments described herein and may be modified or adapted without departing from the scope of the present invention.

LIST OF REFERENCE NUMERALS 4 tower
6 nacelle
8 hub
10 blades
14 blade tip
16 blade root
18 leading edge
20 trailing edge
30 root region
32 transition region
34 airfoil region
36 pressure side shell part
38 suction side shell part
40 shoulder 41 spar cap
42 fibre layers
43 sandwich core material
45 spar cap
46 fibre layers
47 sandwich core material
50 first shear web
51 core member
52 skin layers
55 second shear web
56 sandwich core material of second shear web
57 skin layers of second shear web
60 filler ropes
61 first shell half
62 second shell half
64 shear web
65 first edge of shear web
66 second edge of shear web
67 inner surface of first shell half
68 inner surface of second shell half
69 shear web mounting region
70 first guide member
71 hollow body
72 guiding surface of first guide member
73 curved outer surface
74 base part
74a front end of base part
74 back end of base part
75 first front part
76 second front part
77 back part
78 curved section
79 ridges
80 second guide member
82 guiding surface of second guide member
84 first mould part
85 second mould part
86 first spar cap
87 second spar cap
90 first hollow section
91 second hollow section
92 first internal web
93 second internal web
94 curved edge transition region
L length
r distance from hub
R rotor radius

The invention claimed is:

1. A method of manufacturing a wind turbine blade (10) having a profiled contour including a pressure side and a suction side, and a leading edge and a trailing edge with a chord having a chord length extending therebetween, the wind turbine blade extending in a spanwise direction between a root end and a tip end, the method comprising the steps of:
   providing a first shell half (61) and a second shell half (62);
   providing a shear web (64) having a first edge (65) and an opposing second edge (66);
   attaching the first edge (65) of the shear web (64) to an inner surface (67) of the first shell half (61);
   providing at least one guide member (70), the guide member comprising a hollow body (71) and a guiding surface (72);
   mounting the at least one guide member (70) onto an inner surface (68) of the second shell half (62), wherein the guide member (70) is mounted adjacent to a predefined shear web mounting region (69) on the inner surface (68) of the second shell half (62), such that the guiding surface (72) forms an angle with the inner surface (68) of the second shell half (62) at the shear web mounting region (69);
   bringing the first and second shell halves (61, 62) together while guiding the second edge (66) of the shear web over the guiding surface (72) of the guide member towards the shear web mounting region (69); and
   attaching the second edge (66) of the shear web (64) to the shear web mounting region (69) of the second shell half (62),
   wherein the at least one guide member (70) further comprises:
      a base part (74) for attachment to the inner surface of the second shell half, the base part having a front end (74a) and an opposing back end (74b);
      a first front part (75) extending from the front end (74a) of the base part (74) and oriented substantially perpendicular to the base part (74), a transition between the base part (74) and the first front part (75) defining a right angle;
      a second front part (76) which extends from the first front part (75) at an angle relative to the first front part (75), wherein the guiding surface (72) of the guide member is provided by the outer surfaces of the first front part (75) and the second front part (76);
      a back part (77) extending from the back end of the base part and oriented substantially perpendicular to the base part; and
      a curved section (78) which extends between the back part (77) and the second front part (76).

2. The method according to claim 1, wherein at least one pair of guide members (70, 80) is provided, each pair comprising a first guide member (70) and a second guide member (80), and wherein the first and the second guide members (70, 80) are mounted at opposite sides of the predefined shear web mounting region (69), as seen in a chordwise direction, wherein the respective guiding surfaces (72, 82) of the first and the second guide member face towards each other.

3. The method according to claim 2, wherein the step of mounting the pair of guide members (70, 80) onto the inner surface of the second shell half comprises removably arranging a spacing tool on the inner surface of the second shell, such that the spacing tool extends in a chordwise direction, and mounting the first guide member and the second guide member to the inner surface of the second shell half such that each guide member abuts a respective end surface of the spacing tool.

4. The method according to claim 2, wherein a plurality of pairs of guide members (70, 80) are mounted onto the inner surface of the second shell half, the pairs of guide members being spaced at intervals in the spanwise direction.

5. The method according to claim 1, wherein the guide member (70) is an extruded or an injection-moulded polymer part.

6. The method according to claim 1, wherein the guide member (70) comprises a hollow body (71) which is open at opposing ends of the guide member.

7. The method according to claim 1, wherein the guide member (70) comprises at least one curved outer surface (73).

8. The method according to claim 1, wherein an outer surface area of the base part is at least 80% of an outer surface area of the back part.

9. The method according to claim 8, wherein the outer surface area of the base part is at least 100% of the outer surface area of the back part.

10. The method according to claim 1, wherein the base part (74) further comprises one or more ridges (79) extending from an outer surface of the base part in between the front end (74a) and the back end (74b) of the base part.

11. The method according to claim 1, wherein the guide member (70) comprises an internal web subdividing the hollow body into a first hollow section and a second hollow section.

12. A wind turbine blade (10) having a profiled contour including a pressure side and a suction side, and a leading edge and a trailing edge with a chord having a chord length extending therebetween, the wind turbine blade extending in a spanwise direction between a root end and a tip end, the wind turbine blade comprising:
a first shell half (61) and a second shell half (62) joined together and defining an interior space in between the shell halves;
at least one shear web (64) having a first edge (65) and an opposing second edge (66), wherein the first edge (65) of the shear web is attached to an inner surface (67) of the first shell half, and the second edge (66) of the shear web is attached to an inner surface (68) of the second shell half; and
at least one guide member (70) comprising a hollow body (71) and a guiding surface (72), the guide member being mounted onto the inner surface (68) of the second shell half adjacent to the second edge of the shear web, such that the guiding surface forms an angle with the inner surface (68) of the second shell half,
wherein the at least one guide member (70) further comprises:
a base part (74) for attachment to the inner surface of the second shell half, the base part having a front end (74a) and an opposing back end (74b);
a first front part (75) extending from the front end (74a) of the base part (74) and oriented substantially perpendicular to the base part (74), a transition between the base part (74) and the first front part (75) defining a right angle;
a second front part (76) which extends from the first front part (75) at an angle relative to the first front part (75), wherein the guiding surface (72) of the guide member is provided by the outer surfaces of the first front part (75) and the second front part (76);
a back part (77) extending from the back end of the base part and oriented substantially perpendicular to the base part; and
a curved section (78) which extends between the back part (77) and the second front part (76).

13. The wind turbine blade (10) according to claim 12, comprising at least one pair of guide members, each pair comprising a first guide member (70) and a second guide member (80), and wherein the first and the second guide members (70, 80) are mounted at opposite sides of the predefined shear web mounting region, as seen in a chordwise direction, wherein the respective guiding surfaces of the first and the second guide member face towards each other.

14. The wind turbine blade (10) according to claim 12, wherein each guide member comprises:
a base part for attachment to the inner surface of the second shell half, the base part having a front end and an opposing back end;
a first front part extending from the front end of the base part and oriented substantially perpendicular to the base part;
a second front part which extends from the first front part at an angle relative to the first front part, wherein the guiding surface of the guide member is provided by the outer surfaces of the first front part and the second front part;
a back part extending from the back end of the base part and oriented substantially perpendicular to the base part; and
a curved section which extends between the back part and the second front part.

15. A guide member (70) for guiding a shear web of a wind turbine blade in a method of manufacturing a wind turbine blade, the guide member being an extruded or an injection-moulded polymer part, and comprising a hollow body (71) and a guiding surface (72), the guide member further comprising:
a base part for attachment to the inner surface of a second shell half of the wind turbine blade, the base part having a front end and an opposing back end;
a first front part extending from the front end of the base part and oriented substantially perpendicular to the base part, a transition between the base part and the first front part defining a right angle;
a second front part which extends from the first front part at an angle relative to the first front part;
a back part extending from the back end of the base part and oriented substantially perpendicular to the base part; and
a curved section which extends between the back part and the second front part.

* * * * *

UNITED STATES PATENT AND TRADEMARK OFFICE
CERTIFICATE OF CORRECTION

PATENT NO. : 12,290,995 B2  
APPLICATION NO. : 18/275801  
DATED : May 6, 2025  
INVENTOR(S) : Michael Wenani Nielsen et al.

Page 1 of 1

It is certified that error appears in the above-identified patent and that said Letters Patent is hereby corrected as shown below:

On the Title Page

Item (71) Applicants, please remove the second Applicant country "(DK)" and replace with "(NL)".

Signed and Sealed this  
Seventeenth Day of June, 2025

Coke Morgan Stewart  
*Acting Director of the United States Patent and Trademark Office*